United States Patent [19]

Lee

[11] Patent Number: 5,738,502

[45] Date of Patent: Apr. 14, 1998

[54] VALVE KEEPER FOR A VALVE OF A RECIPROCATING COMPRESSOR

[75] Inventor: Tae-Kyung Lee, Suwon, Rep. of Korea

[73] Assignee: Samsung Electronics Co., Ltd., Suwon, Rep. of Korea

[21] Appl. No.: 685,019

[22] Filed: Jul. 22, 1996

[30] Foreign Application Priority Data

Jul. 26, 1995 [KR] Rep. of Korea ............. 95-22347

[51] Int. Cl.$^6$ ............................................. F04B 39/10
[52] U.S. Cl. ............... 417/569; 417/571; 137/855; 137/856
[58] Field of Search ................. 417/569, 571; 137/855, 856

[56] References Cited

U.S. PATENT DOCUMENTS

| 1,682,908 | 9/1928 | Osgood | 417/569 |
| 3,039,487 | 6/1962 | Doeg | 417/569 |
| 5,209,260 | 5/1993 | Baek | 417/569 |
| 5,327,932 | 7/1994 | Rozek | 417/571 |

FOREIGN PATENT DOCUMENTS

| 891313 | 3/1962 | United Kingdom | 137/855 |

*Primary Examiner*—Timothy Thorpe
*Assistant Examiner*—Cheryl J. Tyler
*Attorney, Agent, or Firm*—Burns, Doane, Swecker & Mathis, L.L.P.

[57] ABSTRACT

A cylinder assembly of a reciprocating compressor has exhaust valve elements including an exhaust valve reed, a stopper and a keeper. The keeper has two opposite fixed ends pressed against a valve seat by the cylinder head. Each of the fixed ends of the keeper includes an elastically deformable portion arranged to be elastically deformed by a pressing force of the cylinder head. This ensures accurate positioning of the keeper, regardless of the magnitude of the pressing force from the cylinder head.

1 Claim, 4 Drawing Sheets

VALVE KEEPER FOR A VALVE OF A RECIPROCATING COMPRESSOR

BACKGROUND OF THE INVENTION

1. Field of the Invention

The present invention relates to a cylinder assembly of a reciprocating compressor.

2. Prior Art

A compressor is an apparatus used for compressing gas such as refrigerant in a refrigerating system. Referring to FIG. 4, a conventional compressor used in a refrigerating system has a cylinder assembly 200 and a driving motor 100 for driving the cylinder assembly 200. The driving motor 100 includes a stator 102, a rotor 101, and a rotor shaft 103 fixedly fitted in the rotor 101 so that the shaft 103 rotates together with the rotor 101. The cylinder assembly 200 includes a cylinder body 180, a cylinder head 160, and a piston 181 reciprocating in the cylinder body 180, so as to compress the refrigerant introduced in the cylinder body 180.

FIG. 5 is an exploded perspective view of valve elements and a cylinder head to be assembled on a cylinder body in a conventional cylinder assembly 200, and FIG. 6 is a partial sectional view of the conventional cylinder assembly 200.

As shown, the cylinder assembly 200 includes a suction valve plate 110, a valve seat 120, an exhaust valve reed 131, a stopper 133, a keeper 140, and a gasket 150 between the valve seat 120 and the cylinder head 160. The valve seat 120 is formed with a suction port 123 and an exhaust port 121, respectively through which the refrigerant is introduced into and exhausted out of the cylinder body 180. The suction valve plate 110 is interposed between the valve seat 120 and the cylinder body 180 and has a suction valve reed 111 for opening and closing the suction port 123. The exhaust valve reed 131 is disposed on the valve seat 120 so as to open and close the exhaust port 121. The stopper 133 guides the resiliently opening deformation of the exhaust valve reed 131. The keeper 140 restricts the maximum displacement of the stopper 133 so that the stopper 133 can define the boundary of the opening movement of the exhaust valve reed 131. The cylinder head 160 is mounted on the valve seat 120, while the gasket 150 is interposed between the valve seat 120 and the cylinder head 160, so that the gasket 150 seals therebetween to prevent the refrigerant from leaking therethrough.

The valve seat 120 has a plurality of screw holes 126, through which a plurality of screws 163 pass to assemble the cylinder head 160 on the cylinder body 180. The cylinder head 160 has an introduction tube 171 and an exhaust tube 173 connected thereinto. The introduction tube 171 and the exhaust tube 173 are respectively connected to an introduction chamber and an exhaust chamber defined in the cylinder head 160. The introduction chamber and the exhaust chamber communicate with the suction port 123 and the exhaust port 121 respectively.

A recess 125 for accommodating the exhaust valve reed 131, the stopper 133, and the keeper 140 is formed on the valve seat 120. The keeper 140 has fixed ends 141 one of which is disposed in the recess 125.

The exhaust valve reed 131 and the stopper 133 have fixed ends 132, 135 respectively, which are positioned under the keeper 140 in the recess 125. When the fixed end 141 of the keeper 140 is accommodated in the recess 125 and pressed by the cylinder head 160, the fixed end 132 of the exhaust valve reed 131 and the fixed end 135 of the stopper 133 in turn is fixed in the recess 125 by the keeper 140.

The suction valve reed 111 and the exhaust valve reed 131 elastically close the suction port 123 and the exhaust valve port 121, respectively. When the piston 181 moves from the top dead point to the bottom dead point in the cylinder body 180, the pressure in the cylinder body 180 is lowered and thereby the suction valve reed 111 is bent toward inside of the cylinder body 180, to open the suction port 123 to introduce the refrigerant into the cylinder body 180, and the exhaust port 121 remains closed by the exhaust valve reed 131.

When the piston 181 moves from the bottom dead point to the top dead point in the cylinder body 180, the pressure in the cylinder body 180 is elevated and the suction port 123 is closed by the suction valve reed 111, while the refrigerant in the cylinder body 180 is compressed. At the same time, the compressed refrigerant urges the exhaust valve reed 131 to bend toward outside of the cylinder body 180 to open the exhaust port 121, thereby the refrigerant is exhausted out of the cylinder body 180 through the exhaust port 121. Through the above process, the refrigerant is sucked into, compressed in, and then exhausted out of the cylinder body 180 by the reciprocating movement of the piston 181.

A free end of the stopper 133 is in contact with the inner surface of the keeper 140. The stopper 133 guides and restricts opening bending of the exhaust valve reed 131, and the keeper 140 restricts deformation of the exhaust valve reed 131 and the stopper 133. That is, when the exhaust valve reed 131 is bent to open the exhaust port 121 by the compressed refrigerant, the stopper 133 which is in contact with the exhaust valve reed 131 is elastically bent together with the exhaust valve reed 131 to restrict sudden or excessive bending of the exhaust valve reed 131. The keeper 140 prevents the stopper 133 from being excessively deformed.

In the conventional cylinder assembly as described above, the exhaust valve reed 131, the stopper 133 and the keeper 140 are pressed and fixed on the valve seat 120 by the cylinder head 160, and the fixing force or pressing force by the cylinder head 160 is based on the tightening force applied to the screws 163. Therefore, the gap of the exhaust valve reed 131 and the stopper 133 to the keeper 140 is variable according to the tightening force applied to the screws 163 and a pressed deformation of the gasket 150.

Moreover, a fixed end 141 of the keeper 140, which is pressed by the cylinder head 160, has uneven portions, under which the stopper 133 is pressed and fixed. Thus, a variation in the tightening force of the screws 163 results in variation in the fixing points of the fixed ends 135, 132 of the stopper 133 and the exhaust valve reed 131. Consequently, the opening degree and opening timing of the exhaust port 121 may be variable, resulting in a deterioration of the compression efficiency and a noise generation due to change in the resonant frequency of the valve element.

SUMMARY OF THE INVENTION

The present invention has been made to overcome the above described problems of the prior art, and accordingly it is an object of the present invention to provide a cylinder assembly of a reciprocating compressor, by which the fixing positions of a keeper, a stopper and an exhaust valve reed are accurately guaranteed, regardless of a variation in the assembling force between a cylinder head and a cylinder body of the cylinder assembly.

To achieve the above objects, the present invention provides a cylinder assembly of a reciprocating compressor, the cylinder assembly comprising:

a cylinder body; a cylinder head; a valve seat formed with a suction port and an exhaust port, and disposed between cylinder body and the cylinder head; a suction valve plate having a suction valve reed for opening and closing the suction port; an exhaust valve reed for opening and closing the exhaust port; a stopper for elastically guiding opening bending movement of the exhaust valve reed, the stopper having a fixed end and a free end; a keeper restricting an excessive elastic deformation of the stopper, and having two opposite fixed ends pressed against the valve seat by a pressing force of the cylinder head; [Each of the fixed ends includes] an elastically deformable portion elastically deformed under the pressing force of the cylinder head.

Preferrably, the fixed ends of the keeper are slit along a slit line in the longtudinal direction of the keeper, and each of the elastically deformable portions comprises a pair of opposite claws bent toward the cylinder head along the slit line.

To secure the stopper and the suction valve reed in position, the keeper may further comprise a protuberance for pressing the fixed end of the stopper on the valve seat.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE PREFERRED EMBODIMENT

Figure 1:
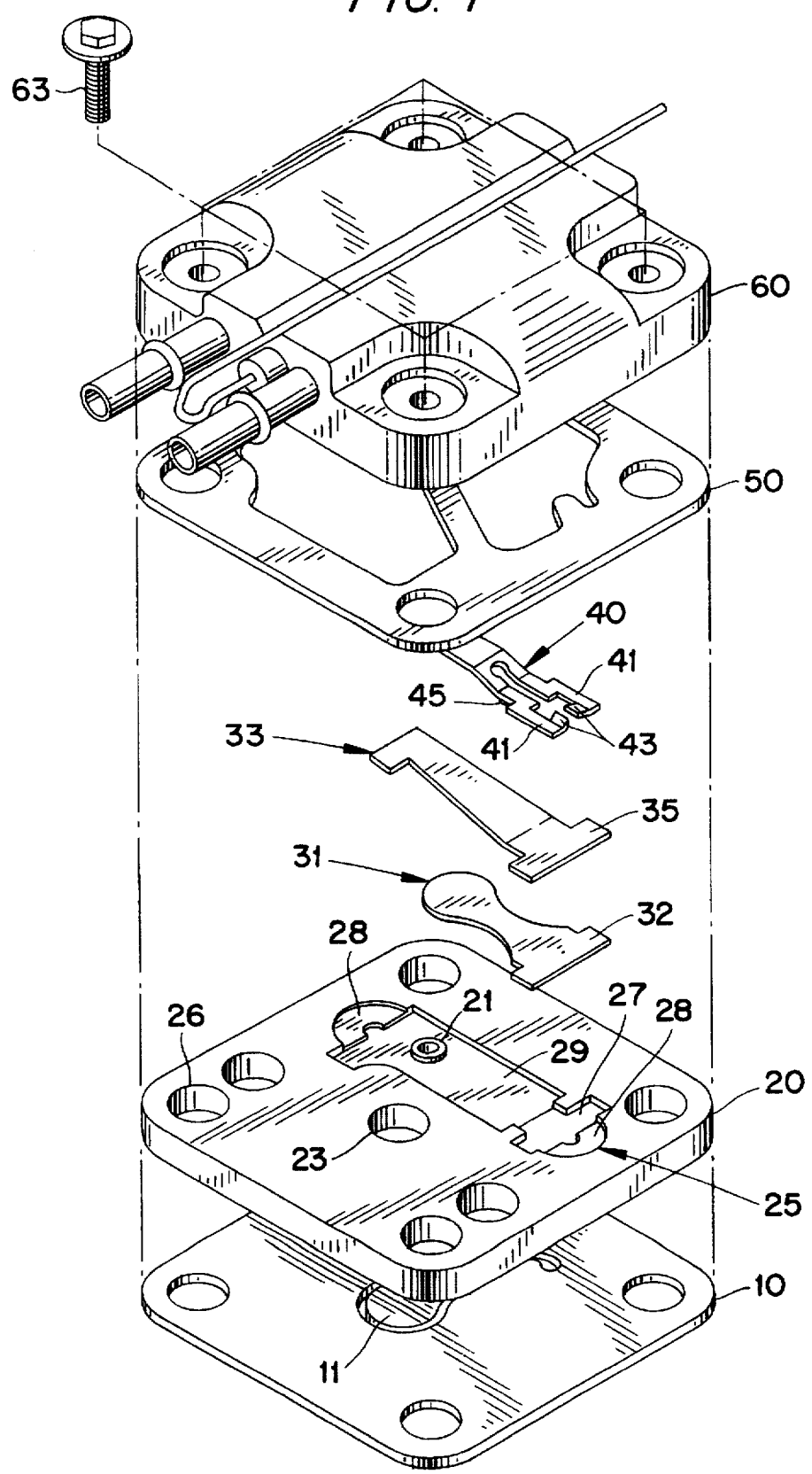
FIG. 1 is an exploded perspective view showing a cylinder head and valve elements for a cylinder assembly according to the present invention.

Hereinafter, a preferred embodiment of the present invention will be described in detail with reference to FIGS. 1–3. In the following description, the same elements as those in the conventional cylinder assembly will be briefly mentioned.

Figure 6:
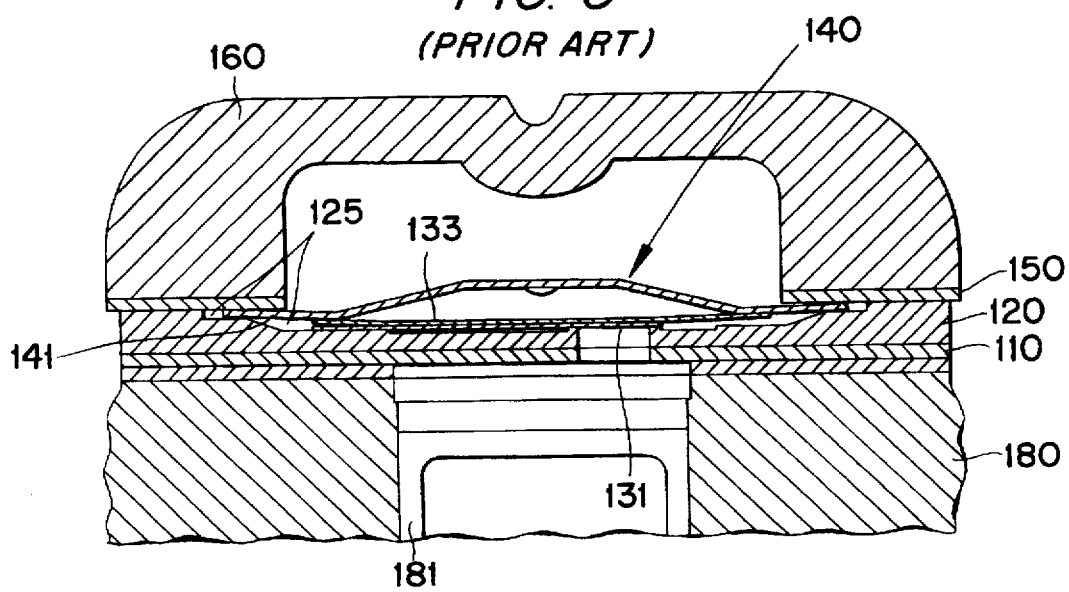
FIG. 6 is a partial sectional view of the conventional cylinder assembly shown in FIG. 5.
Figure 5:
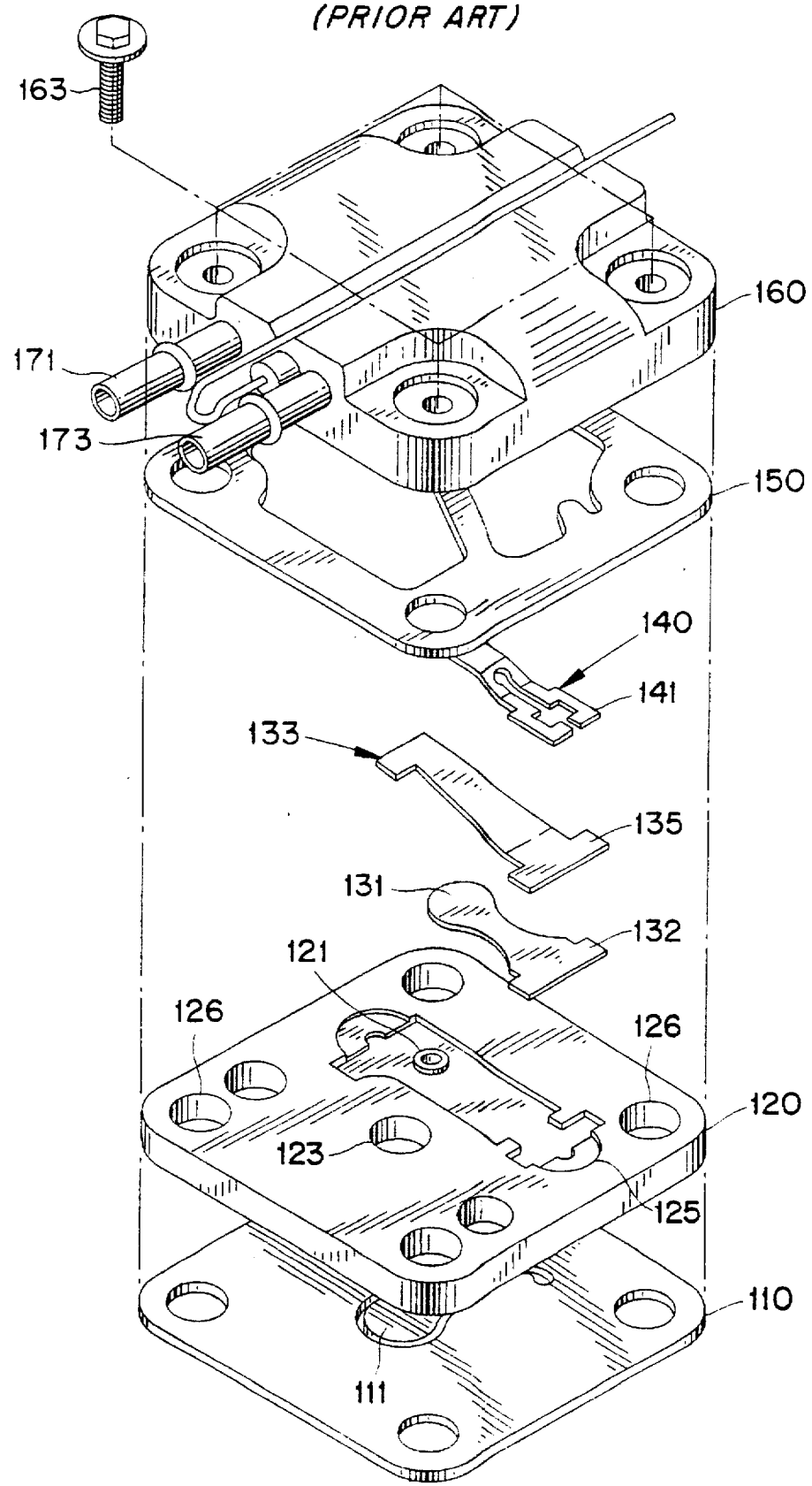
FIG. 5 is an exploded perspective view showing a cylinder and valve elements for a conventional cylinder assembly.

The cylinder assembly according to the present invention, includes as does the conventional cylinder assembly shown in FIGS. 5 and 6, a suction valve plate 10, a valve seat 20, an exhaust valve reed 31, a stopper 33, a keeper 40 having a bridge-like shape, and a gasket 50 disposed between a cylinder body 80 and a cylinder head 60. The valve seat 20 is formed with a suction port 23 and an exhaust port 21, respectively, through which the refrigerant is introduced into and exhausted out of the cylinder body 80. The suction valve plate 10 is interposed between the valve seat 20 and the cylinder body 80, and has a suction valve reed 11 for opening and closing the suction port 23. On the opposite side of the valve seat 20, the exhaust valve reed 31 is disposed so as to open and close the exhaust port 21. The valve seat 20 further has a plurality of screw holes 26, and the cylinder head 60 is assembled on the cylinder body 80 through the screw holes 26 by a plurality of screws 63.

A recess 25 for accommodating the exhaust valve reed 31, the stopper 33, and the keeper 40 is formed on the valve seat 20. The recess 25 includes a first stage or step 28 for receiving opposite fixed ends 41 of the keeper 40, a second step 27 for receiving a fixed end 32 of the exhaust valve reed 31 and fixed end 35 of the stopper 33, and a lowest third step 29 provided around the exhaust port 21.

The two opposite fixed ends 41 of the keeper 40 in the first step 28 of the recess 25 are pressed against the valve seat 20 by the cylinder head 60, so that the keeper 40 is fixed.

The fixed end 32 of the exhaust valve reed 31 and the fixed end 35 of the stopper 33 disposed on the second step 27 in turn are pressed by the keeper 40 against the valve seat 20. A free end of the exhaust valve reed 31 closing the exhaust port 21 and a free end of the stopper 33 are therefore elastically deformable by the compressed refrigerant through the exhaust port 21.

Figure 2:
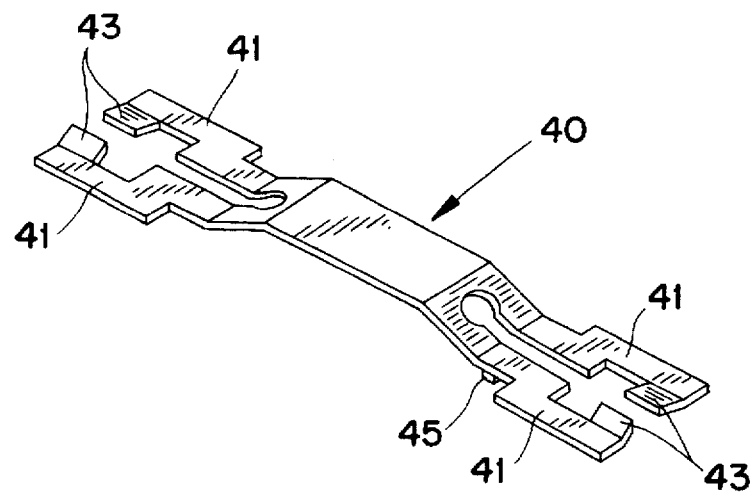
FIG. 2 is an enlarged perspective view of a keeper shown in FIG. 1.
Figure 3:
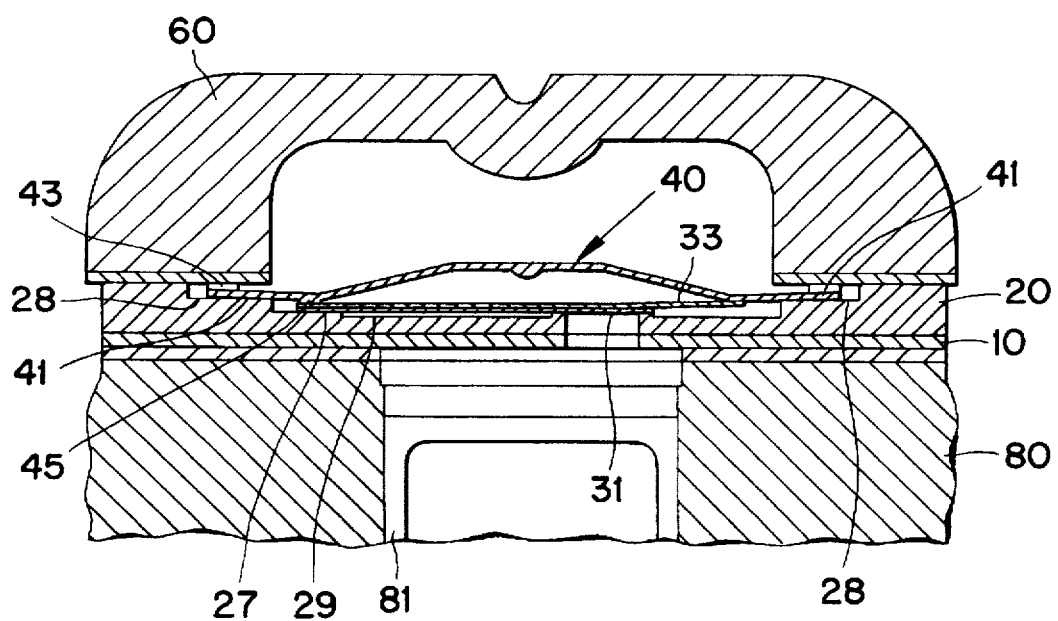
FIG. 3 is a partial sectional view of the cylinder assembly shown in FIG. 1.
Figure 4:
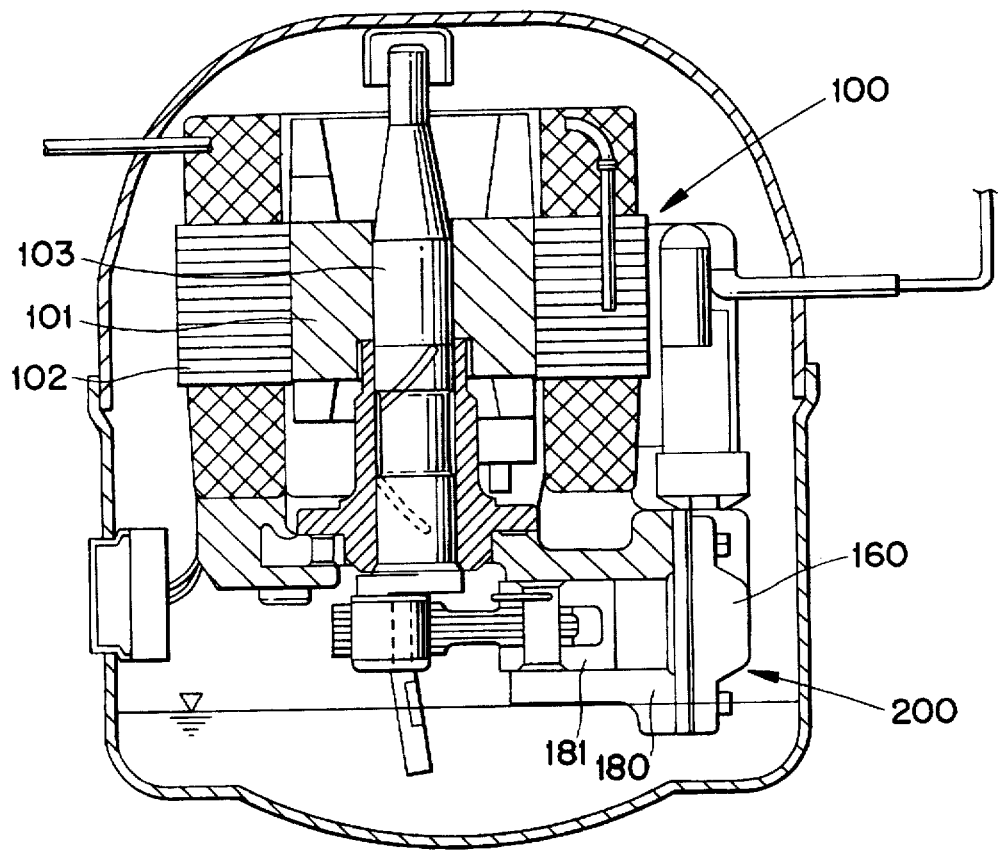
FIG. 4 is a sectional view of a prior art reciprocating compressor.

The fixed ends 41 of the keeper 40, as enlargedly shown in FIG. 2 are logitudinally slit to a certain extent. Along the slit line of the fixed ends 41, a pair of claws 43 are formed are upwardly bent in their relaxed (undeformed) state so as to extend away from the valve seat 20 and toward the cyliner head 60. The claws 43 protrude upward from the upper surfaces of the fixed ends 41. Thus, when the cylinder head 60 presses the fixed ends 41 of the keeper 40 against the valve seat 20 to settle the keeper 40, the pressing force of the cylinder head 60 is first applied to the claws 43, so that the claws 43 are elastically deformed to cause the keeper 40 to be fixed in position. Therefore, even when the pressing force of the cylinder head 60 is varied according to a change in the tightening force applied to the screws 63 (since the cylinder head 60 does not directly press the fixed ends 41 of the keeper 40) the keeper 40 is not displaced at all but only the bending amount of the claws 43 is changed.

Accordingly, regardless of a variation in the pressing force by the cylinder head 60 or the tightening force of the bolts 63, a firm settlement of the keeper 40 is guaranteed and the relative positioning between the keeper 40 and the stopper 33 or the exhaust valve reed 31 can be accurately maintained, resulting in ensuring the designed opening degree and opening timing of the exhaust port 21, thereby to maintain the compressing efficiency of the compressor and restrain the noise generation due to mispositioning of the valve elements.

Furthermore, the keeper 40 has a protuberance 45 protruding downward from the lower surface of the keeper 40. The protuberance 45 is formed at a position corresponding to the second step 27 of the recess 25, so as to contact and press the fixed end 35 of the stopper 33 when the keeper 40 is settled in the recess 25 of the valve seat 20. In this case, the pressing force transferred through the keeper 40 from the cylinder head 60 is concentrated on the fixed end 35 of the stopper 33 by the protuberance 45, the protuberance engaging a top surface of the fixed end 35, which surface faces away from the valve seat. Therefore, the stopper 33 and the exhaust valve reed 31 are fixed firmly by the keeper 40 in position.

According to the present invention as described above, there is provided a cylinder assembly of a reciprocating compressor, by which an accurate positioning of the keeper is guaranteed, and thereby the compression efficiency is maintained and the generation of noise is reduced, regardless of variations in the assembling force between the cylinder head and the cylinder body.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A cylinder assembly of a reciprocating compressor, the cylinder assembly comprising:

a cylinder body forming a bore for receiving a reciprocable piston;

a valve seat formed with a suction port and an exhaust port, and disposed at an end of the bore;

a suction valve plate having a suction valve reed for opening and closing the suction port;

an exhaust valve reed for opening and closing the exhaust port;

an elastic stopper for guiding a bending movement of the exhaust valve reed, the stopper having a fixed end and a free end, the fixed end including a surface facing away from the valve seat;

a keeper having two opposite longitudinally spaced ends engaging the valve seat, each end being slit along a slit line in a longitudinal direction of the keeper to form therein a pair of elastically deformable claws bent away from the valve seat in their relaxed state, the keeper further including a protuberance spaced from the claws and engaging the surface of the fixed end of the stopper; and a cylinder head pressed against the claws for elastically deforming the claws against the valve seat and pushing the protuberance against the surface of the fixed end of the stopper.

\* \* \* \* \*